Concentration of indomethacin and oxyphenbutazone in the serum after separate and combined application of 50 mg indomethacin and 200 mg oxyphenbutazone.

United States Patent Office 3,551,570
Patented Dec. 29, 1970

3,551,570
COMPOSITION AND METHOD FOR TREATING INFLAMMATION WITH OXYPHENBUTAZONE AND INDOMETHACIN
Gerhard Wilhelmi, Riehen, Switzerland, assignor to Geigy Chemical Corporation, Greenburgh, N.Y., a corporation of Delaware
Continuation of application Ser. No. 524,605, Feb. 2, 1966. This application Feb. 28, 1969, Ser. No. 805,998
Claims priority, application Switzerland, Nov. 25, 1965, 16,238/65; Nov. 29, 1965, 16,390/65
Int. Cl. A61k 27/00
U.S. Cl. 424—273   2 Claims

ABSTRACT OF THE DISCLOSURE

A method and compositions for the treatment of inflammatory conditions utilizing mixtures of either phenylbutazone or oxyphenbutazone and indomethacin.

---

Figure 1:
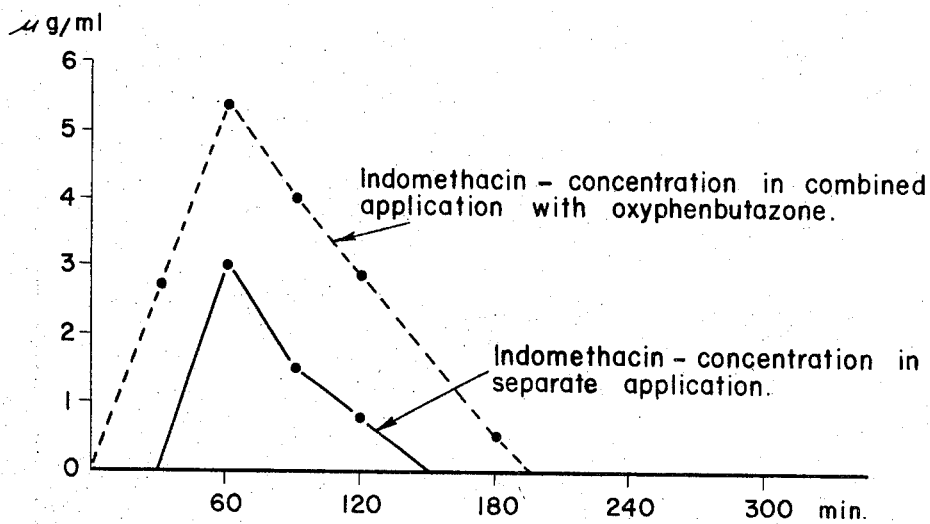
Figure 2:
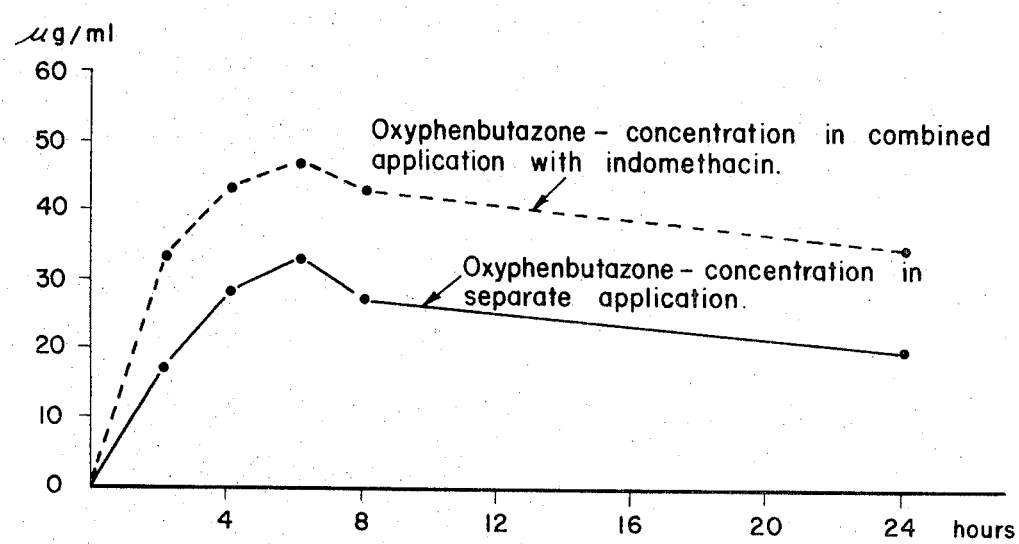

This is a continuation application of Ser. No. 524,605, filed Feb. 2, 1966 and now abandoned.

The present invention relates to new pharmaceutical compositions for the treatment of arithritic and other rheumatic diseases as well as of other inflammatory conditions of various origin and locality.

Among the nonsteroid drugs, phenylbutazone (4-n-butyl-1,2-diphenyl - pyrazolidine-3,5-dione) was proved early to be useful in the treatment of arithritic and other rheumatic diseases. Subsequently, a hydroxyl-substituted derivative thereof, oxyphenbutazone, (4-n-butyl-1-(p-hydroxyphenyl)-2-phenyl-pyrazolidine-3,5-dione), has also come to be used with great success for the same and similar indications. However, phenylbutazone in particular, can only be prescribed with care for patients who have previously suffered from stomach or intestinal ulcers since it can lead to an activation of the ulcers. In addition, both substances can cause sodium retention which, in susceptible patients, can sometimes lead to oedema formation. Recently, after thorough pharmacological and clinical testing, an antiphlogistically active substance from a different class of compounds, indomethacin, (1-(p-chlorobenzoyl)-5-methoxy-2-methylindole-3-acetic acid) has become available to the medical profession. Indomethacin is especially useful because considerably lower dosages of this drug can accomplish the same therapeutic action obtainable with the two pyrazolidine derivatives mentioned above. Unfortunately, side effects also occur with these lower dosages of indomethacin. In particular, headaches are sometimes observed. These are very unpleasant, particularly in ambulant treatment because, in some cases, they are followed by dizziness and vomiting.

It is an object of the present invention to make available combinations of drugs for the treatment of arthritic and other rheumatic diseases and also of inflammatory conditions of various origin and locality. It is a further object to provide antiinflammatory compositions which are distinguished by a more intensive action and a broader range of action than would be predictable from the additive behavior of each ingredient. Another object of the present invention is to provide compositions of medicaments having a lower incidence of side effects and increased tolerance by the patient.

It has surprisingly been found that indomethacin on the one hand and oxyphenbutazone or phenylbutazone on the other, each potentiates the antiphlogistic action of the other, i.e., they have a synergistic action. For a composition comprising indomethacin and oxyphenbutazone, this potentiation can be seen, for example, in tests on formalin-induced oedema in the rat, conducted by the method of G. Wilhelmi (Arzneim, Forsch. 10, 129 (1960)—a modification of the method described by H. Selye (Brit. Med. J. 1949/II, 1129). In a dosage of 400 mg./kg. per os 60 minutes before an injection of formaldehyde in the hind paw, oxyphenbutazone brought about a 23% reduction in the swelling calculated on the swelling in control animals which had not received an antiphlogistic. In the same test, indomethacin in a dosage of 25 mg./kg. is inactive (5% increase in size of swelling). In contrast to these results the combination of 200 mg. of oxyphenbutazone with 10 mg. of indomethacin caused an unexpectedly sizable reduction in the swelling of 43% even though this combination contained only half of a moderately active dosage of oxyphenbutazone and only 40% of an inactive dosage of indomethacin. This clearly demonstrates a remarkable potentiation of oxyphenbutazone by indomethacin.

Determinations of the concentration of indomethacin and oxyphenbutazone in serum after administration of 50 mg. of indomethacin and 200 mg. of oxyphenbutazone to humans both separately and combined (5 patients for each dosage) confirm the above findings in that after oral administration of the two active substances combined, each brings about a considerable rise in the blood level of the other. In the accompanying drawing, FIG. 1 shows that the maximal concentration of indomethacin, about 54 μg./ml., following combined administration in a composition according to this invention, is about 80% higher than the maximal concentration of 30 μg./ml. attained after administration of indomethacin alone. In addition, measurable concentrations are attained more quickly and maintained longer. In the case of oxyphenbutazone, the maximal value attained 6 hours after combined administration with indomethacin according to this invention is shown to be about 50% higher than when oxyphenbutazone is administered by itself. In this case, it is remarkable to note the much quicker rise in concentration on the one hand and the finding on the other that the concentration, even 24 hours after combined administration, is greater than the maximum attained on administration of the substance by itself and that it is about 75% higher than the concentration 24 hours after administration of the substance alone.

In UV-erythema in guinea pigs, according to the method described by G. Wilhelmi (Schweiz. Med. Wschr. 80, 936 (1950)), and $ED_{50}$ (effective antiinflammatory dose in one-half of the animals) of 2.5 mg./kg. per os was established for indomethacin and one of 1.6 mg./kg. for phenylbutazone. For a combination of both substances in proportion to their $ED_{50}$, it was found that the $ED_{50}$ surprisingly fell to 1.1 mg./kg. per os (which dose comprises 0.67 mg. of indomethacin and 0.43 mg. of phenylbutazone) whereas an $ED_{50}$ of 2.05 mg. was expected from a purely additive action of the combination. Here, each component in the combination potentiates the action of the other in a synergistic manner.

In contrast to the antiphlogistic actions, the toxicity is not potentiated by the combination according to the invention. For example, the $LD_{50}$ of a combination of 3 parts by weight of oxyphenbutazone and 1 part by weight of indomethacin on a single oral administration to the rabbit is 0.617 g./kg. For oxyphenbutazone alone an $LD_{50}$ of 1.30 g./kg. was determined and for indomethacin one of 0.141 g./kg. was found. An $LD_{50}$ for the combination of about 0.425 g./kg. would correspond to a purely additive effect so that the $LD_{50}$ found is considerably higher than this calculated value.

According to the present invention, there is provided a pharmaceutical composition comprising a physiologically acceptable carrier or diluent, phenylbutazone, oxyphenbutazone or a mixture thereof, and a proportion of indomethacin sufficient to enhance the antiphlogistic activity of the phenylbutazone or oxyphenbutazone.

Expressed in terms of proportion of the pyrazolidine derivatives, the indomethacin is associated with from about 0.5 part to about 20 parts by weight of phenylbutazone, oxyphenbutazone or a mixture thereof per part by weight of the indomethacin. Compositions comprising indomethacin associated with from about 2 parts to about 10 parts of phenylbutazone or oxyphenbutazone per part by weight of said indomethacin have been found to be particularly valuable in the treatment of inflammatory conditions.

In a specific embodiment of the invention, there is provided a pharmaceutical composition in dosage unit form comprising a pharmaceutically acceptable carrier and indomethacin and from about 0.5 part to about 20 parts, and especially from about 2 parts to about 10 parts, of phenylbutazone, oxyphenylbutazone or mixtures thereof per part by weight of said indomethacin.

An important further embodiment of the instant invention is a method for alleviating inflammatory conditions which comprises administering to a host an effective amount of a pharmaceutical composition of the invention. This is in essence a method for alleviating inflammatory conditions which comprises administering to a host an effective amount of a composition comprising indomethacin and from about 0.5 part to about 20 parts, and especially from about 2 parts to about 10 parts, of phenylbutazone, oxyphenbutazone or mixtures thereof per part by weight of said indomethacin.

Still another valuable embodiment of the instant invention comprises a method for potentiating the effects of phenylbutazone or oxyphenbutazone which consists in administering the phenylbutazone or oxyphenbutazone in admixture with indomethacin, said phenylbutazone or oxyphenbutazone being present in an amount to provide from about 0.5 part to about 20 parts, and especially from about 2 parts to about 10 parts, by weight of said indomethacin.

The term "host" when used herein and in the appended claims contemplates animals broadly, particularly mammals, and especially humans.

The new pharmaceutical compositions are distinguished by excellent tolerance since the content of the individual active components can be so low that their known side effects do not occur or are very limited in extent. The new pharmaceutical compositions have a wide range of action and are suitable for the treatment of a number of inflammatory conditions. The term "inflammatory conditions" contemplates diseases or other pathological conditions which are commonly alleviated by treatment with antiphlogistic (antiinflammatory) agents. Illustrative conditions alleviated through practice of the instant invention include: rheumatic diseases such as rheumatic fever, rheumatoid arthritis, ankylosing spondylitis, osteoarthritis, disc lesions, periarthritis, tendoperiostitis, epicondylitis, fibrositis, myositis, myalgia, degenerative joint diseases and also nonrheumatic disorders such as superficial thrombophlebitis, gout, as well as other acute inflammatory conditions.

The new pharmaceutical compositions consist of dosage units which are suitable for the oral, rectal or parenteral, particularly intramuscular, administration of daily dosages of from 25 to 125 mg. of indomethacin in combination with from 500 to 125 mg. of phenylbutazone or oxyphenbutazone. These daily dosages are generally distributed over from 1 to 12 dosage units, for example from 2 to 12 tablets or dragées (sugar coated tablets) each having a total content of both components together from 25 to 300 mg., from 1 to 4 suppositories having a total content of from 100 to 500 mg. or from 1 to 4 ampoules each having a total content of from 50 to 250 mg. In general, the active components are in free form; particularly in dosage unit forms for parenteral administration however, they can also be in the form of nontoxic, water soluble salts such as sodium salts or salts with nontoxic organic bases.

In dosage unit forms for oral administration, the weight of the combined active substances indomethacin, phenylbutazone and/or oxyphenbutazone together, is, preferably, between 10% and 90% of the total weight of the dosage unit. They are produced by combining the active substances with, for example, solid, pulverulent carriers such as lactose, saccharose, sorbitol, mannitol; starches such as potato starch, maize starch or amylopectin; also laminaria powder or citrus pulp powder, cellulose derivatives or gelatine, optionally with the addition of lubricants such as magnesium or calcium stearate or polyethylene glycols (Carbowaxes) of suitable molecular weights, to form tablets or dragée cores. The latter are coated for example, with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g., to distinguish between varying dosages of active substance.

Examples of dosage units for rectal administration are suppositories which consist of a combination of indomethacin, phenylbutazone and/or oxyphenbutazone with a neutral fatty foundation, or also gelatine rectal capsules which contain a combination of the active substances with polyethylene glycols (Carbowaxes) of suitable molecular weight.

Ampoules for parenteral, particularly intramuscular, administration preferably contain water soluble salts, e.g., the sodium salts, of indomethacin and phenylbutazone in a concentration of, preferably, 0.5–5% in aqueous solution, optionally together with suitable stabilizing agents and buffer substances.

The following examples further illustrate the production of tablets and dragées without in any way limiting the scope of the invention.

EXAMPLE 1

750.0 g. of oxyphenbutazone and 250.0 g. of indomethacin are mixed with 550.0 g. of lactose and 292.0 g. of potato starch, the mixture is moistened with an alcoholic solution of 8.0 g. of gelatine and granulated through a sieve. After drying, 60.0 g. of potato starch, 60.0 g. of talcum, 10.0 g. of magnesium stearate and 20.0 g. of colloidal silicium dioxide are mixed in and the mixture is pressed into 10,000 tablets each weighing 200 mg. and containing 100 mg. of a combination comprising one part of indomethacin and three parts of oxyphenbutazone per part by weight of indomethacin. If desired, the tablets can be grooved for better adaptation of the dosage.

EXAMPLE 2

125.0 g. of phenylbutazone and 25.0 g. of indomethacin are well mixed with 16.0 g. of maize starch and 6.0 g. of colloidal silicium dioxide. The mixture is moistened with a solution of 2.0 g. of stearic acid, 6.0 g. of ethyl cellulose and 6.0 g. of stearin in about 70 ml. of isopropyl alcohol and then granulated through a sieve III (Ph. Helv. V). The granulate is then dried for about 14 hours and then passed through a sieve III–IIIa. The granulate is then mixed with 16.0 g. of maize starch, 16.0 g. of talcum and 2.0 g. or magnesium stearate and pressed into 1,000 dragée cores. These are coated with a concentrated syrup of 2.000 g. of shellac, 7.5000 g. of gum arabic, 0.150 g. of dyestuff, 2.000 g. of highly dispersed silicium dioxide, 25.000 g. of talcum and 53.350 g. of sugar, and dried. The dragées obtained each weight 310 mg. and contain 150 mg. of combination of active substances in which for each part of indomethacin there is 5 parts by weight of phenylbutazone.

I claim:

1. A pharmaceutical composition in dosage unit form comprising a pharmaceutically acceptable carrier and (a) indomethacin and (b) about 20 parts of oxyphenbutazone per part by weight of said indomethacin.

2. A method for alleviating inflammatory conditions which comprises administering to a host an effective amount of a composition comprising (a) indomethacin and (b) about 20 parts of oxyphenbutazone per part by weight of said indomethacin.

References Cited

Current Practice (August 1964), page 429.

British Medical Journal (May 26, 1962), No. 5290, page 1475.

ALBERT T. MEYERS, Primary Examiner

S. J. FRIEDMAN, Assistant Examiner

U.S. Cl. X.R.

424—273